United States Patent [19]
Popescu et al.

[11] Patent Number: 5,487,156
[45] Date of Patent: Jan. 23, 1996

[54] PROCESSOR ARCHITECTURE HAVING INDEPENDENTLY FETCHING ISSUING AND UPDATING OPERATIONS OF INSTRUCTIONS WHICH ARE SEQUENTIALLY ASSIGNED AND STORED IN ORDER FETCHED

[76] Inventors: Valeri Popescu, 12686 Monterey Cypress, San Diego, Calif. 92130; Merle A. Schultz, 1013 Fern St., Escondido, Calif. 92027; Gary A. Gibson, 2624 La Golandrina, Carlsbad, Calif. 92009; John E. Spracklen, 3540 Moultrie Ave., San Diego, Calif. 92117; Bruce D. Lightner, 10305 Moselle St., San Diego, Calif. 92131

[21] Appl. No.: 622,893

[22] Filed: Dec. 5, 1990

Related U.S. Application Data

[63] Continuation-in-part of Ser. No. 451,403, Dec. 15, 1989, abandoned.

[51] Int. Cl.$^6$ ........................................ G06F 9/30
[52] U.S. Cl. ........................ 395/375; 364/DIG. 1; 364/231.8; 364/262.4; 364/262.9
[58] Field of Search ............................................. 395/375

[56] References Cited

U.S. PATENT DOCUMENTS

| | | | |
|---|---|---|---|
| 4,626,989 | 12/1986 | Torii | 395/375 |
| 4,675,806 | 6/1987 | Uchida | 395/375 |
| 4,722,049 | 1/1988 | Lahti | 395/375 |
| 4,803,615 | 2/1989 | Johnson | 395/375 |
| 4,807,113 | 2/1989 | Matsumoto et al. | 395/375 |
| 4,807,115 | 2/1989 | Torng | 395/375 |
| 5,146,570 | 9/1992 | Hester et al. | 395/375 |
| 5,226,126 | 7/1993 | McFarland et al. | 395/375 |

OTHER PUBLICATIONS

Sohi; "Instruction Issue Logic for High-Performance, Interruptable, Multiple Function Unit, Pipelined Computers"; IEEE Transactions on Computers, vol. 39, No. 3, Mar. 1990.

IEEE Transactions on Computers, vol. 37, No. 5, May 1988, New York, US, pp. 562-573, Smith & Pleszkun "Implementing Precise Interrupts in Pipelined Computers", pp. 566-568, Sections IV-VI.

IEEE Transaction on Computers, vol. 36, No. 9, Sep. 1986, New York, US, pp. 815-828, Actosta et al. "An Instruction Issuing Approach to Enhancing Performance in Multiple Functional Unit Processors", p. 817, Section IV.

4th Annual Symposium on Computer Architecture 23 Mar. 1977, Long Beach, US., pp. 29-34, Ramseyer & Van Dam "A Multi-Microprocessor Implementation of a General Purpose Pipelined CPU", p. 30, Section 3.

11th Annual International Symposium on Computer Architecture 5 Jun. 1984, Michigan, US, pp. 110-118, Weiss & Smith "Instruction Issue Logic for Pipelined Supercomputers".

*Primary Examiner*—Krisna Lim
*Attorney, Agent, or Firm*—Townsend and Townsend and Crew

[57] ABSTRACT

A processor architecture is described which operates with improved computational efficiency using instruction fetching functions that are decoupled from instruction execution functions by a dynamic register file. The instruction fetching function operates in free-running mode which does not stop if a fetched instruction cannot be executed due to data being unavailable or due to other instruction dependencies. Branch instructions are taken in a predicted direction and the results of execution of all instructions are provisionally stored pending validation or invalidation on the basis of the dependencies becoming available later. For branches of executed instructions that are later invalidated, the results of the executed instructions are flushed from provisional storage and the initial instruction which previously executed at the beginning of a branch on predicted dependencies is re-executed on the actual data that subsequently became available, and all subsequent instructions in such branch are also re-executed on the basis of dependencies actually available from execution of previous instructions in such branch.

36 Claims, 11 Drawing Sheets

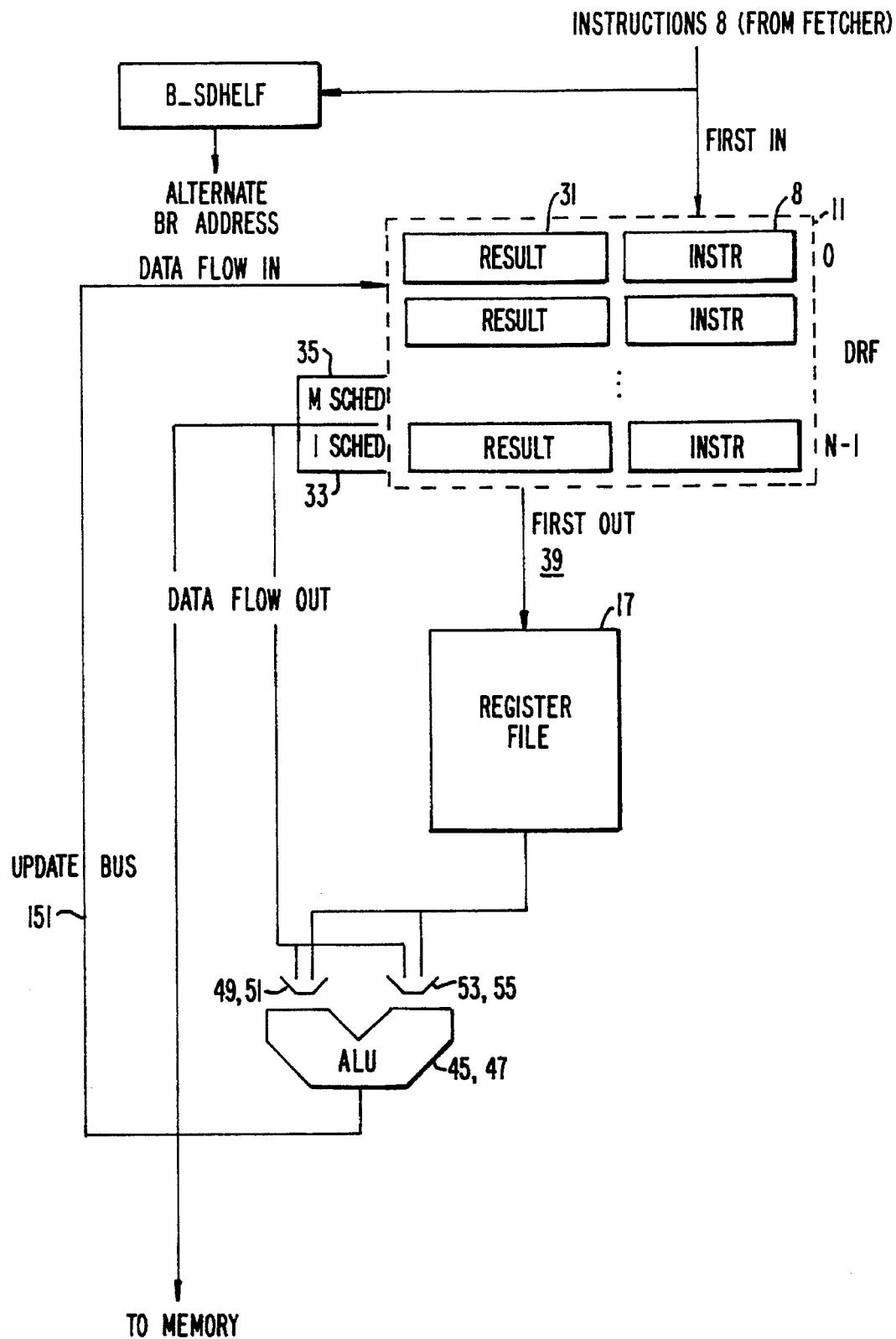
FIG._1.

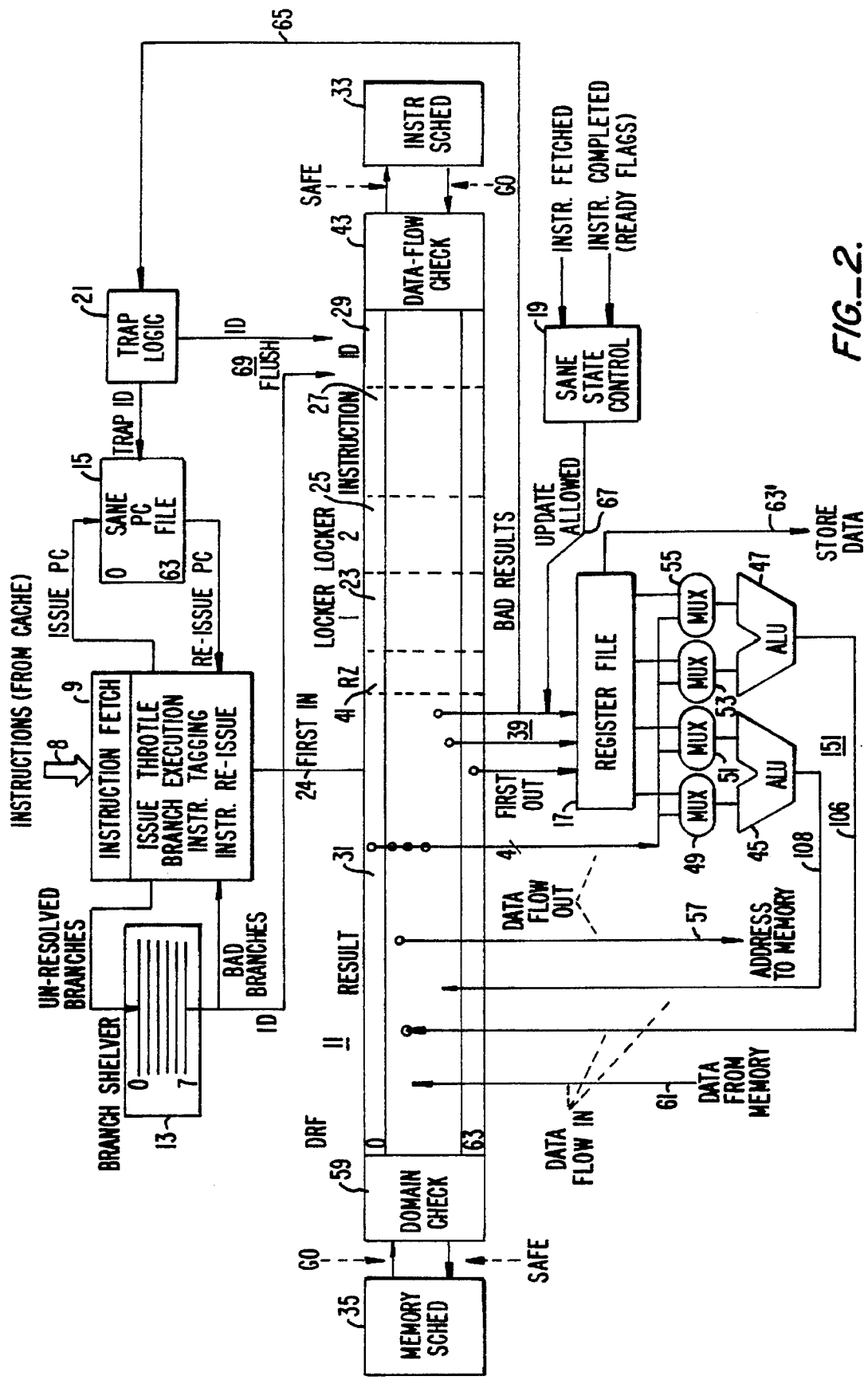
FIG._2.

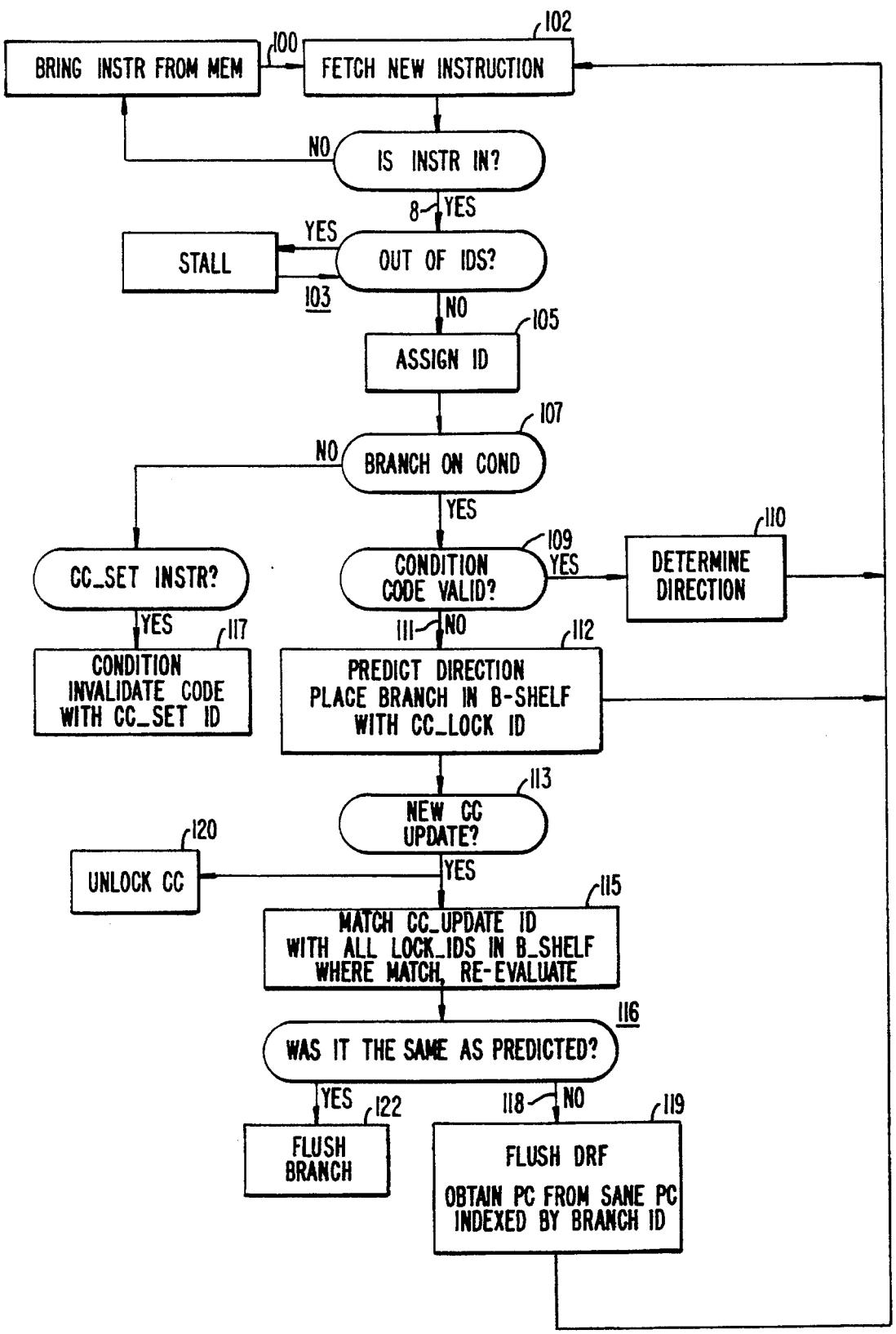
FIG._3.

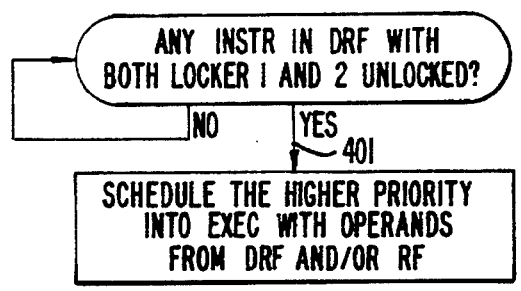
FIG._4.
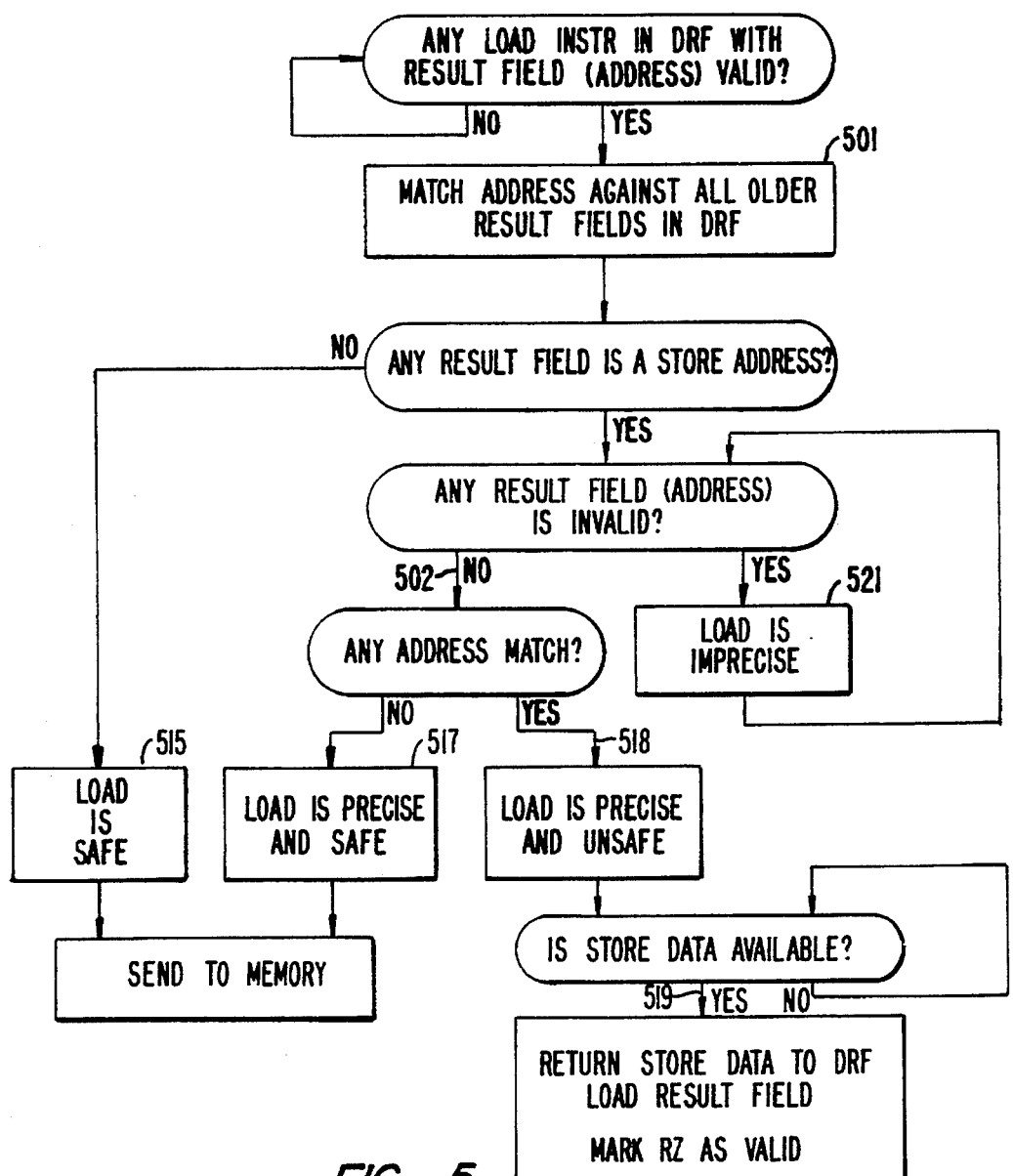
FIG._5.

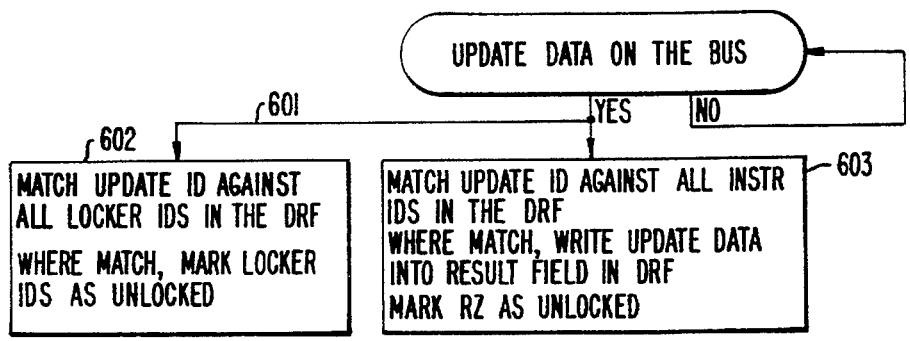
FIG._6.
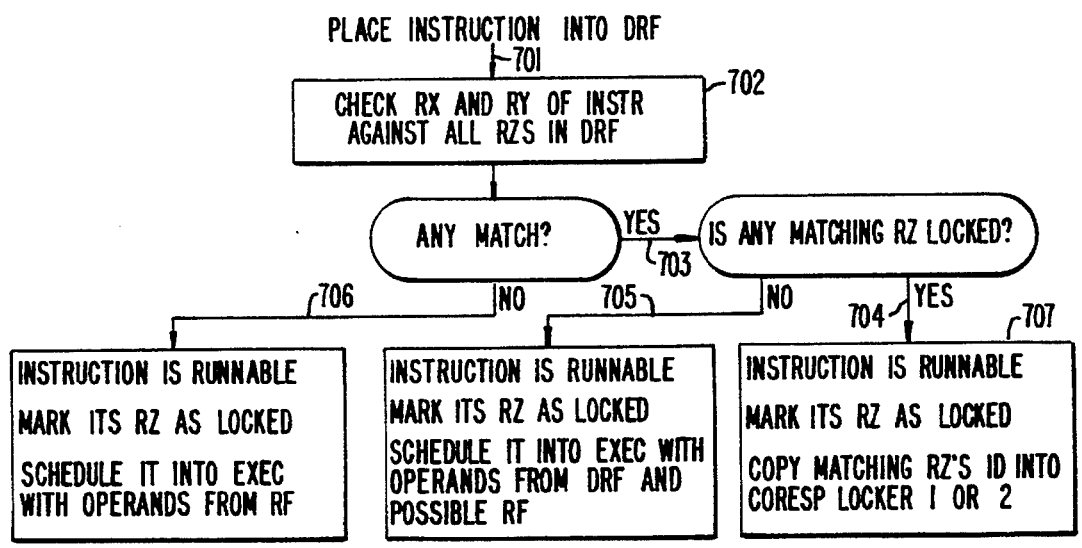
FIG._7.
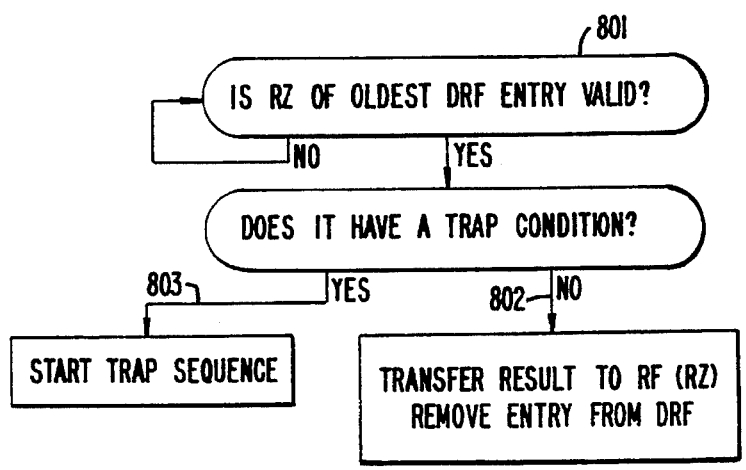
FIG._8.

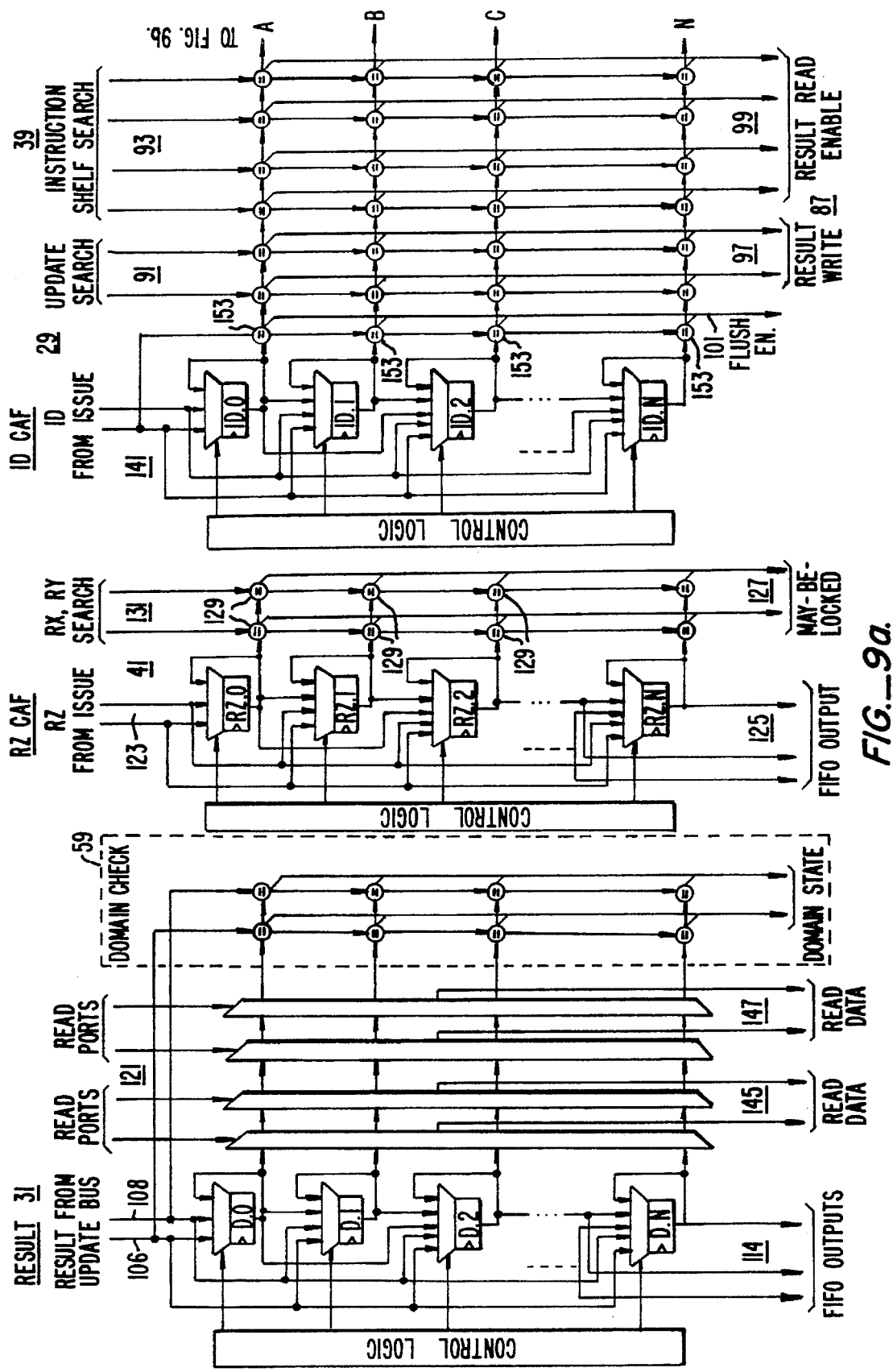
FIG._9a.

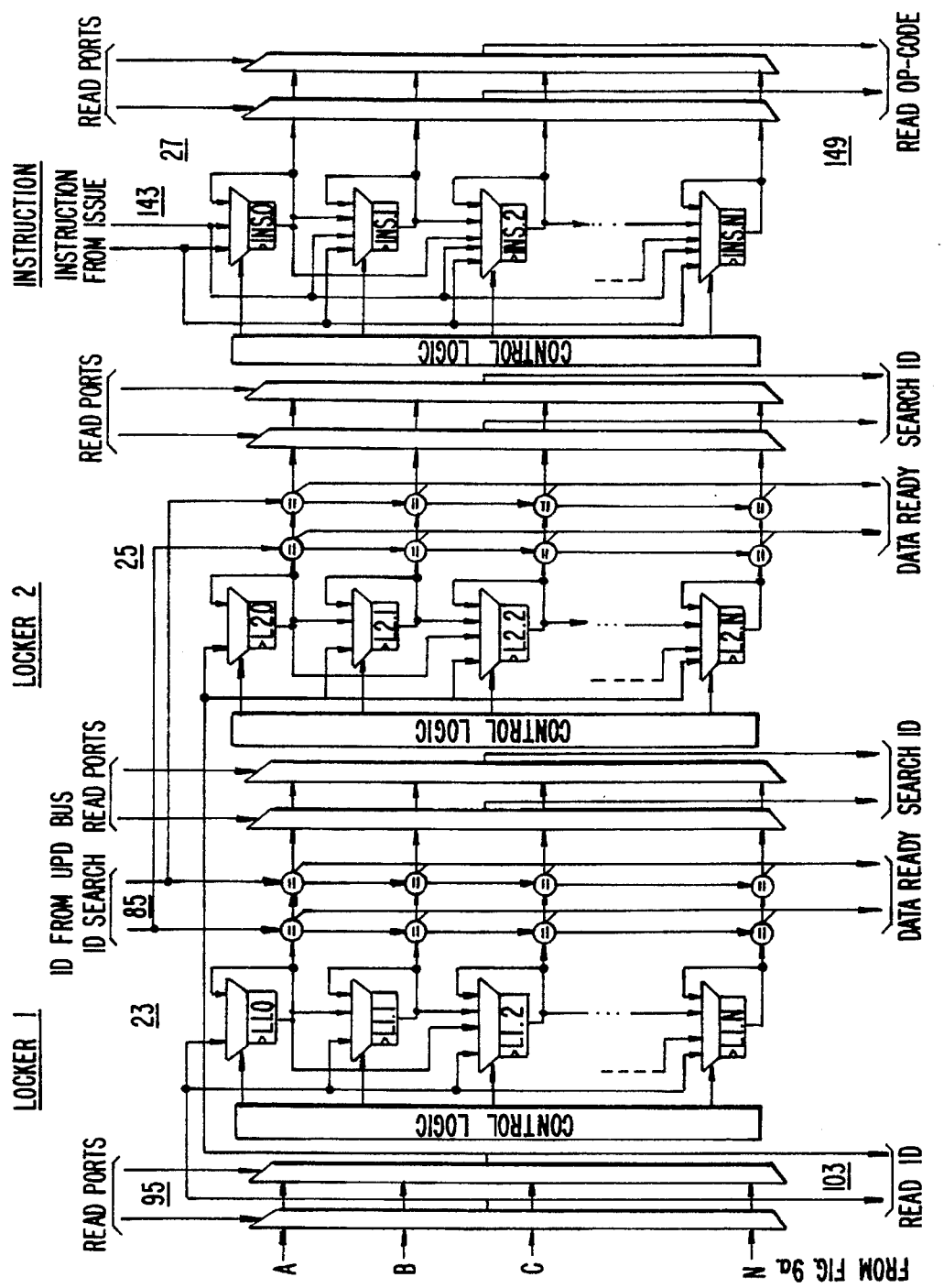
FIG._9b.

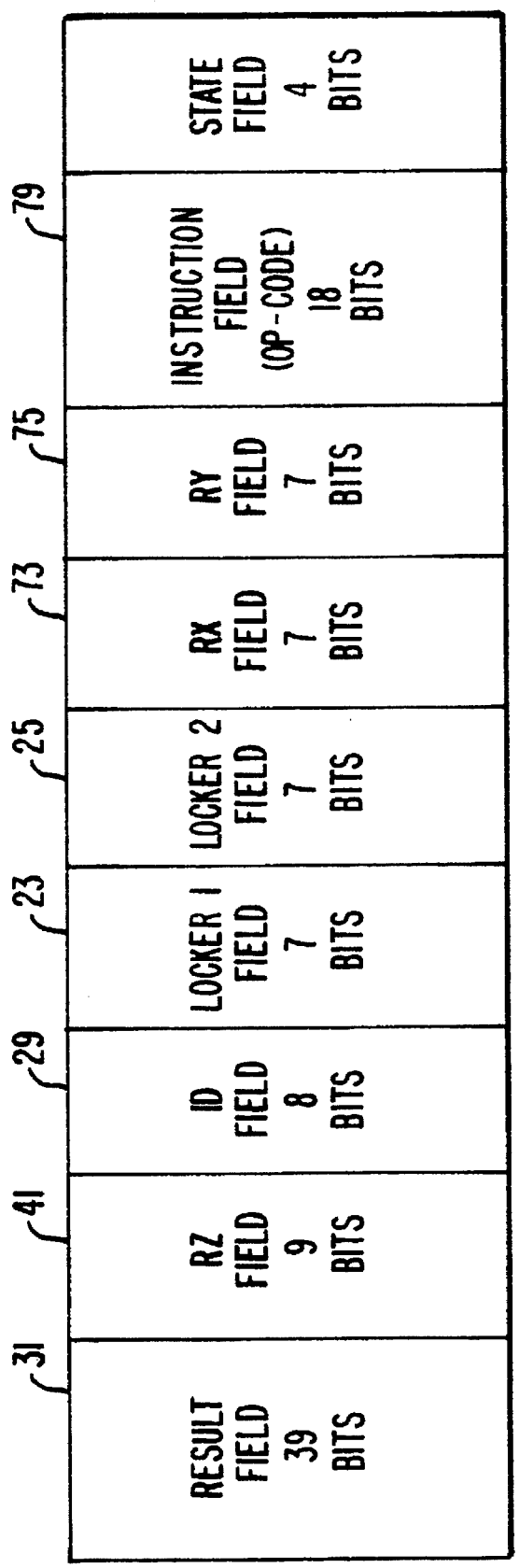
FIG._10.

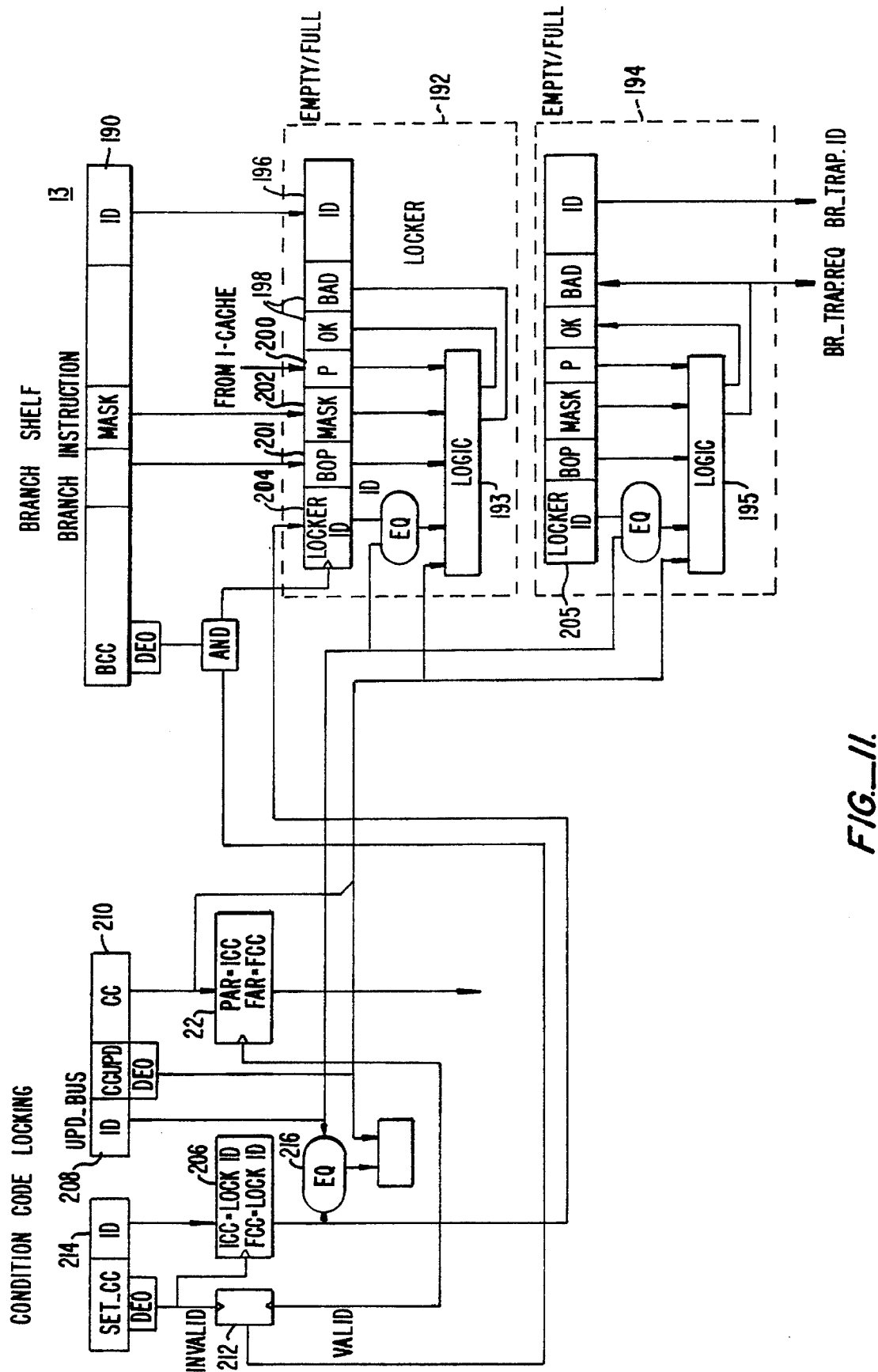
FIG._11.

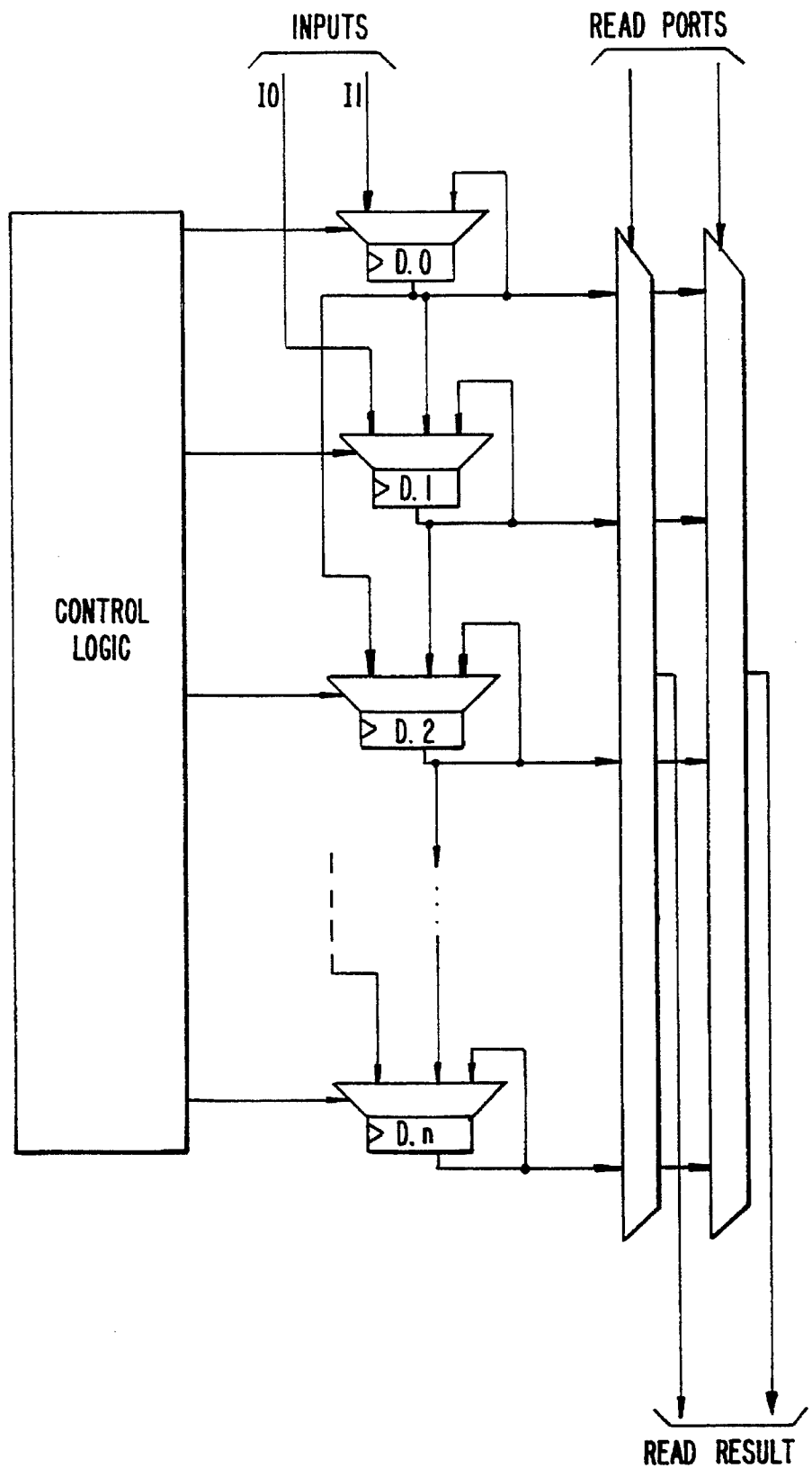
FIG._12.

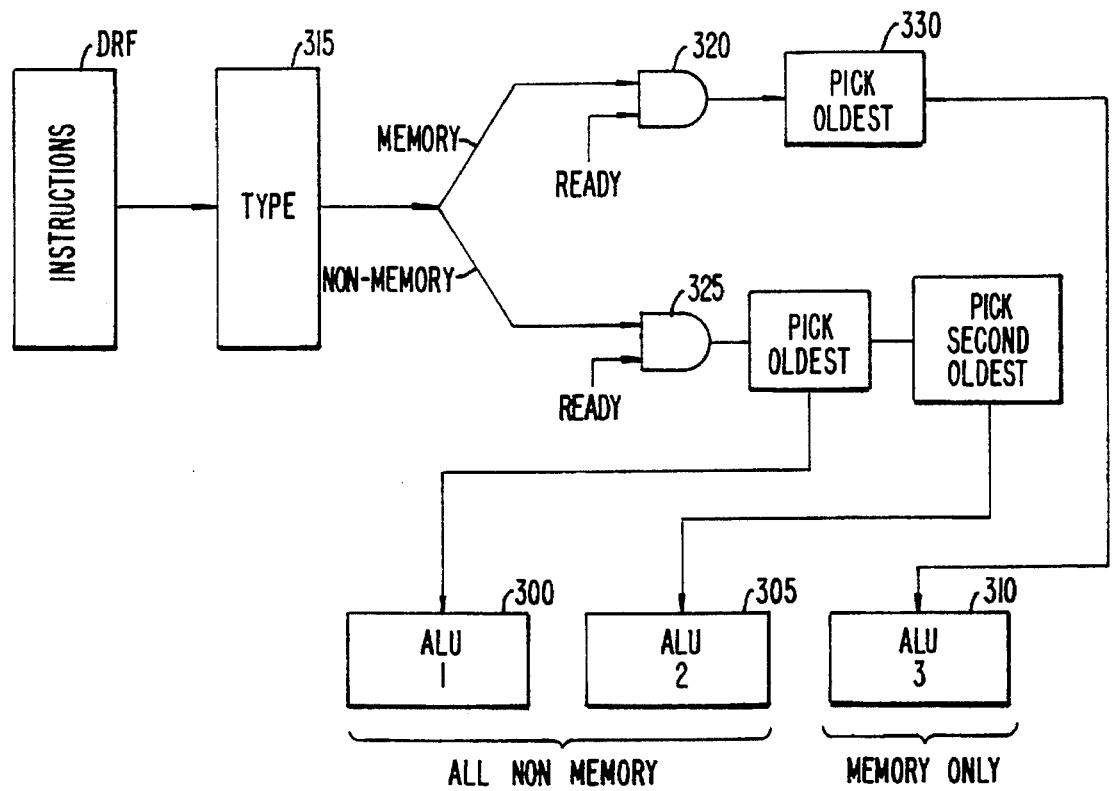
FIG._13.
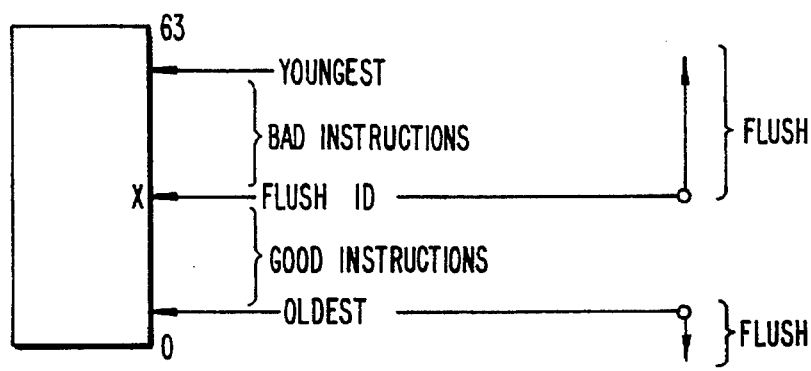
FIG._14a.
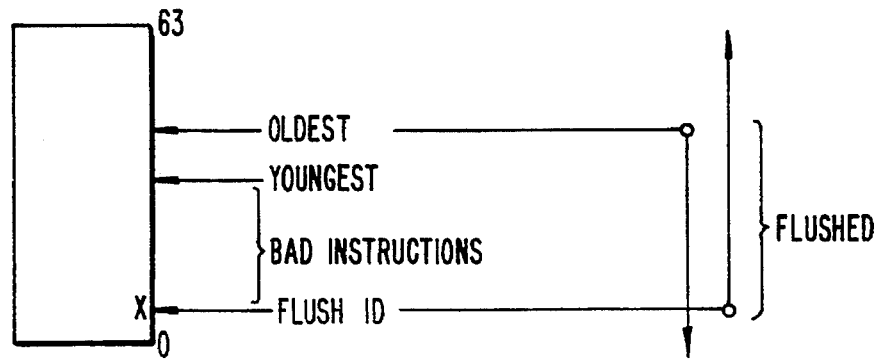
FIG._14b.

PROCESSOR ARCHITECTURE HAVING INDEPENDENTLY FETCHING ISSUING AND UPDATING OPERATIONS OF INSTRUCTIONS WHICH ARE SEQUENTIALLY ASSIGNED AND STORED IN ORDER FETCHED

CROSS-REFERENCE TO RELATED APPLICATION

This application is a continuation-in-part of U.S. Ser. No. 451,403, filed Dec. 15, 1989, entitled "Processor Architecture and Method," abandoned.

BACKGROUND OF THE INVENTION

This invention relates to the architecture and operation of an improved processor in which instructions for execution are fetched in free-running manner.

Conventional processor designs commonly involve the control of instructions in three stages—fetch, issue, execute. In the first stage, an instruction is fetched from memory at a location identified by a program counter which points to the latest fetched instruction, thereby allowing the next instruction to be fetched. Following the fetch, the instruction is checked for possible data dependencies and, if it passes the test, the instruction and its operands are then issued for execution. (Data dependencies are circumstances where an instruction cannot be executed because data for the instruction is not yet available.) The instructions issued can be identified by a issue-virtual program counter. Once an instruction is issued, it is sent to the execution stage, where it produces a result that is written into either a register file or a memory, thereby altering the state of the processor. Another program counter, the update-virtual PC, identifies the instruction that just completed updating the state of the processor. The three such program counters (fetch, issue-virtual and update-virtual) are traditionally synchronized. Thus, an instruction that is fetched is issued if its operands are available, and an instruction that is issued goes through the execution pipeline. At the end of the pipeline, the state of the processor is updated. The instructions are fetched, issued, and executed, and the processor state is updated, in strict sequential order as defined by the order of instructions in the program.

The three program counters (fetch, issue-virtual and update-virtual) in a traditional processor are linked together so that they point to successive adjacent instructions. Thus, at any time, the fetch, issue-virtual and update-virtual program counters in a conventional processor point to instructions N+2, N+1 and N.

More recent advanced processors include another element called a register scoreboard which checks resources for an instruction to see if the required resources are available for the instruction to execute. If so, the instruction is issued even before the instruction in the execution stage has finished, which can result in out-of-order execution. The register scoreboard records (locks) the resources that would be modified by the instruction at issue time. Any subsequent instructions that want to access those resources cannot be issued until the instruction that initially locked them subsequently unlocks them by updating the resources, and so notifying the processor.

These known processor designs operate with the disadvantage that any stop in the issue of instructions, typically due to resource dependency among instructions, will stop the instruction fetch. This stopping results in loss of performance because fewer instructions are issued for execution. The direct dependency between the issue-virtual and the fetch program counters in a conventional processor thus inhibits achievement of peak performance. This loss of performance is even more pronounced when multiple instructions are fetched simultaneously. In a traditional pipelined processor design, putting N pipelines in parallel so N instructions can be fetched in every cycle does not increase the performance by a factor of N because there are interactions between every element in the matrix of pipelines and instructions, thus increasing the data dependency conflicts.

Some prior art processor designs include branch prediction. In such systems when the processor executes an instruction, in which a branch is reached, a prediction is made as to the likely direction of execution. The processor then executes down that branch of instructions while it awaits validation of the first branch. If a second branch is reached before the first one is validated, the processor stops fetching instructions, degrading performance.

SUMMARY OF THE INVENTION

In accordance with a preferred embodiment of the present invention, instruction fetching is decoupled from instruction execution by employing a dynamic register file to create an instruction queuing mechanism. The stages of fetch, issue, and update of the instructions thus can be separate and independently controlled stages. The instruction fetch stage is controlled by a program counter that is free running. The fetch operation does not stop if instructions cannot be issued for execution because of unavailable resources (e.g., data dependencies). The fetch stage only stops fetching instructions when there is no remaining memory in the processor to hold previously fetched and uncompleted instructions.

The instruction fetcher also executes branch instructions. Branch instructions involve changes of the instruction flow. For a fetcher to operate on branches without stopping, it must execute branches whenever they are executable, that is, when the resources needed (the condition codes) are not locked. If branches are not executable, the instruction fetcher predicts the direction of operation and continues to operate in that predicted direction. Instructions fetched on the basis of such a prediction are termed herein "speculative" instructions.

The fetched instructions are sent to instruction issue as the next stage. In the issue stage instructions are checked to determine if the required operands are available. If the check reveals that any operand is not available, then the instruction issue is not stopped, as in conventional designs, but rather that instruction is "shelved" and another instruction, perhaps one previously fetched and shelved, is issued instead.

Because the issued instruction may not be the next in order, the results of instructions that were issued and executed, however, are not immediately placed into the register file or memory. Rather, the results are temporarily stored in the dynamic register file. Therefore these results do not immediately alter the state of the processor. This is because instructions may be issued out-of-order with respect to the order in which they were fetched, and, more importantly, the instructions may be completed out-of-order compared to their order in the program. Once a non-runnable instruction is shelved and the next runnable instruction is sent to execution, the order of producing the results that alter the state of the memory is different than the order of fetching (which corresponds to the program-defined order).

The results of instructions that were executed and saved in the dynamic register file are transferred into memory or the register file, thereby modifying the state of the processor, only in the order in which the instructions were initially fetched. Therefore, the state of the processor is updated just as in a conventional design, that is, in strict sequential instruction order so that the processor is always in a state as would have resulted from strict sequential execution in a conventional processor.

In our preferred embodiment, a fetch program counter points to the next instruction to be fetched, an issue-virtual program counter points to the next instruction to be sent to execution, and an update-virtual program counter points to the instruction whose result is next to update the state of processor. The instruction fetch program counter is free running, continuously fetching instructions in strict program defined order, as long as there is physical space for storing the fetched instructions in the dynamic register file, regardless of whether the instructions fetched are issued. The issue-virtual program counter points to the next instruction to be issued to the execution stage, as determined by a data flow mechanism, that is, a mechanism which determines when the resources that the instruction needs are available. An instruction scheduler controls the data flow stream out of the dynamic register file generating the issue-virtual program counter. The update-virtual program counter advances in the same order as the fetch program counter, so that the state of the processor is modified in the order defined in the program. This provides a strictly sequential model of the processor so that traditional software can be operated unmodified. In the present invention the three program counters—fetch, issue and update-are not linked together, but rather controlled independently to maximize performance, yet maintain a strict sequential instruction view to the software.

For the fetch program counter to operate free running, there is a need for "buffering" between the fetch and issue stages. This is accomplished by the dynamic register file. The dynamic register file provides a buffer which performs an instruction stream-mapping function. Instructions are written into a first port of the dynamic register file on a first-in basis as they are fetched under control of the fetch program counter.

There are two instruction streams at the output of the dynamic register file. One output stream is a data flow stream which represents instructions that are sent for execution when the operands are available, as controlled by the issue-virtual program counter. The results of executing this stream are written back into the dynamic register file. The second output stream of the dynamic register file is a first-out stream which achieves the control flow model by changing the state of the processor register file and memory in strict sequential order. This output stream is controlled by the update-virtual program counter. A device we term the "sane state controller" controls the first-out stream of the dynamic register file generating the update-virtual program counter. Thus, the dynamic register file maps an incoming sequential stream of instructions into a data flow stream for execution and an outgoing sequential stream of results that alter the state of the processor.

Thus, the three ports of the dynamic register file and their controls are: (1) instruction-in (fetch program counter); (2) data flow in/out—instruction scheduler (issue-virtual program counter); and (3) results out—sane state controller (update-virtual update program counter). This technique provides a traditional control flow model to the software while closely approaching optimum computational efficiency of the data flow execution model.

DESCRIPTION OF THE DRAWINGS

FIG. 1 illustrates the primary data flow of a simplified diagram of the architecture of our preferred processor.

FIG. 2 is a block diagram including additional components of the architecture;

FIG. 3 is a flow chart illustrating branch execution operation;

FIG. 4 is a flow chart of data flow out operation;

FIG. 5 is a flow chart illustrating load instruction scheduling in the dynamic register file;

FIG. 6 is a flow chart illustrating data flow;

FIG. 7 is a flow chart illustrating dynamic register file first-in operation;

FIG. 8 is a flow chart illustrating dynamic register file first-out operation;

FIGS. 9a and 9b are schematic diagrams of sections of the dynamic register file according to one embodiment of the present invention; and where FIG. 9a provides signals at its right-side which couple to the left side of FIG. 9b;

FIG. 10 is a pictorial diagram of the data fields in the dynamic register file;

FIG. 11 is a schematic diagram of the condition code and branch shelf circuitry;

FIG. 12 is a diagram illustrating the ordered list structure;

FIG. 13 is a diagram illustrating the system for assigning instructions to multiple ALU's; and FIGS. 14a and 14b illustrate the flushing mechanism.

DESCRIPTION OF THE PREFERRED EMBODIMENT

Instruction Fetcher

The block diagrams of FIGS. 1 and 2, and the flow charts of FIG. 3 to 8, are an architectural overview of a preferred embodiment of a processor according to the present invention. The instruction fetcher 9 (see FIGS. 2 and 3) preferably is coupled to a well-known instruction cache memory (not shown), and receives instructions 8 from the cache memory. Among other functions, the fetcher 9 performs a "throttling" function. For example, if an instruction cannot be fetched from the instruction cache, then the fetcher 9 operates to bring an instruction from the main instruction memory (not shown) for transfer 100 to the instruction cache. Once in the cache the instruction is fetched 102. Other examples of "throttling" functions performed by the fetcher 9 include managing instructions that require multiple clock cycles to dispatch, and managing instructions that cannot be fetched for some reason, for example, identification codes that are not available for assignment to an instruction 103.

As shown in FIG. 2 the fetcher 9 supplies the dynamic register file 11 with the instructions fetched from cache. As the instructions 8 are fetched from cache, they are assigned 105 an identification code 29, or ID, by a counter (not shown) which assigns strictly sequential ID values to each instruction that is fetched in the order fetched. These sequential IDs contain a "color" bit which is the most significant bit, and is used for magnitude comparisons. By comparing the color bits, and, if necessary, the magnitudes of two instruction IDs, the instruction fetched earlier can be determined. This provides an "age" comparison between two instructions, that is, it provides the relative order of when the instructions 8 were fetched from memory.

As shown in FIG. 2, the fetcher 9 also manages branch execution in a manner so that the fetcher 9 does not stop if a branch cannot be executed. For a conditional branch to be executed, it must have valid condition codes 109. The condition codes are set by instructions that modify the condition codes. Thus, at the time when an instruction that modifies condition codes is dispatched, the fetcher 9 invalidates 117 a condition code register by putting a locked bit on it. The fetcher stores the ID of the instruction that locked the condition code. The condition code stays locked until that instruction finishes execution and updates 113 the condition code register, thereby unlocking 120 the condition code.

The content of the condition code register is termed "insane" herein when it does not reflect the state of the processor when updated sequentially, like the register file and memory. For while the condition codes are locked 117, there is an unexpected instruction that will modify the condition code. This prevents a following branch from using the condition code to make a decision. Therefore, the fetcher puts such a following branch instruction in branch shelver 13 together with the ID of the instruction that locked the condition code 112. Only the result of that locking instruction provides valid condition codes for the branch.

In the branch shelver 13, the branch instruction waits until the condition codes become available, i.e., the branch instruction waits until the instruction that locked the condition codes completes execution and updates the condition codes. When a branch is shelved, the fetcher 9 will decide 112, based on prediction bits, which direction down the instruction stream to proceed from that location, in other words, the most probable direction for continued execution of the program. The fetcher 9 will continue to fetch instructions "on speculation" along the predicted path. When the condition codes that a shelved branch instruction is waiting on become valid, then the branch decision is re-evaluated 115 and compared with the initial decision 116. If that comparison indicates that the branch was properly executed, it is removed 122 from the shelf. If the decisions are different on comparison 118, the predicted decision was wrong and the processor must proceed along another not predicted branch. Therefore, the program must resume execution from the branch instruction in another direction.

For the processor to change direction following an incorrectly predicted branch decision 118, the processor must be restartable at any point. For example, assume that there are N instructions allowed in the processor and that there are instructions which are fetched, but not executed. The processor must be able to restart with any instruction that is in the dynamic register file, i.e., any instruction that has not updated the state of memory yet. That function, called restarting, is accomplished with the help of a program counter file, herein termed the "sane" program counter file 15, which is an N-entry register file that contains the addresses of the instructions in the dynamic register file 11, indexed by their IDs. If the processor needs to restart by re-fetching a branch instruction, the ID of the branch is used to index into the sane program counter file 15 and obtain its program counter 119. That program counter is used to restart the processor from that point forward.

In the case 118 when the branch was predicted incorrectly, some number of instructions were put into the execution stream and may have generated results which are in the dynamic register file 11, but have not yet updated the register file 17. They have not been allowed to reach completion by the sane state controller 19 because they are speculative. Upon determination that a branch was incorrectly predicted, a flushing mechanism flushes 119 from the dynamic register file 11 all instructions and their results that were fetched in reliance on the incorrect prediction. The flushing operation is described in conjunction with FIG. 16.

The sane state controller 19 receives from the branch shelver 13 the ID of the shelved branch instruction, or in the case of multiple shelved branches, the ID of the oldest of all the shelved branches (as determined by the order in which they were fetched). The sane state controller 19 does not allow instructions which have an ID that is more recent than the ID of the oldest shelved branch to update the state of the processor, and therefore stops the completion of instructions at that point. This enables the processor to maintain its sane condition by not allowing the speculative results to alter the state of the processor.

The processor may also restart after it encounters a trap condition or an external interrupt. The processor includes trap logic 21 which provides the states of the processor at the point of encountering a trap condition. The ID of the trapping instruction is used to obtain the program counter from the sane program counter file 15. The trap is not responded to until the trapping instruction becomes the oldest in the dynamic register file, in other words until all previously fetched instructions have updated the status of the processor. Then all other instructions are flushed from the dynamic register file.

For interrupts, the ID of the oldest instruction that will next update the status of the processor is used to obtain the program counter. More recent instructions are flushed.

Another function of the fetcher 9 is serialization. Some instructions cannot modify the state of the processor unless all the instructions prior to them have been executed (the "serialization process" herein). When such an instruction is encountered, the fetcher 9 stops fetching and waits until all previously fetched instructions have completed their execution. Once there is not an unexecuted fetched instruction left in the processor, the fetcher will then let that instruction go to execution. When the instruction requiring serialization finishes modifying the state of the processor, fetching resumes.

Dynamic Register File

The dynamic register file 11 holds all non-branch instructions pending within the processor. Every entry in the dynamic register file 11 is a place holder for an instruction. As shown in FIG. 2, the dynamic register file 11 contains the results 31 of execution of the instruction, and includes the destination register field 41 (RZ), locker ID one 23 and locker ID two 25, an instruction field 27 which indicates what instruction is to be performed, and an ID field 29 which is the tag of the instruction. Two lockers 23, 25 are included because instructions typically require two operands to execute. Thus, one locker is provided for each possible operand required for an execution of an instruction.

The dynamic register file 11 is controlled by an instruction scheduler 33 and a memory scheduler 35. These two schedulers 33, 35 perform the resource checking and data flow scheduling to create a data flow stream out of dynamic register file 11. The resource checking determines if the operands needed by an instruction in the dynamic register file 11 are available and if so, where they are located. If they are available, the operands may be located in the dynamic register file 11 or in the register file 17. A required operand will be in the dynamic register file if it resulted from a previously executed, but not completed instruction. The required operand will be in the register file 17 if the instruction that generated the operand was allowed to complete earlier and transferred its results to the register file 17. In the worse case, the operand is not available because the result that will form the required operand has not been generated, i.e., the operand is locked. The two locker fields 23, 25 are used to identify, by ID 29, what instruction will create the result that will form an operand required by an instruction.

When an instruction is executed, the result of that execution is written into the dynamic register file 11 in the result field 31. Results 31 in the dynamic register file 11 then can be used by more recently fetched results for execution. When the instructions reach the output 39 of the dynamic register file 11 by being oldest, they are written into the register file 17 under control of the sane state controller 19.

Thus, the dynamic register file 11 acts as an instruction place holder for each non-branch instruction. Instructions enter the dynamic register file 11 from the instruction fetcher 9 of the processor and the instructions remain in the dynamic register file 11 until they are oldest and are ready to update the register file 17. The oldest instruction, if it has no trap condition, can be written to the register file 17 or to memory.

The results 31 in dynamic register file 11 have a register address (RZ) 41 which designates the register to which results will be written, if the instruction updates the register file 17. For memory store instructions, RZ is used to address the register file 17 for source data to be written to memory.

The dynamic register file 11 also performs a register scoreboarding function. In a conventional register scoreboard method, there is a single valid bit associated with each register number. When an instruction is fetched that writes to a register, the valid bit for that register is set to invalid. Execution of the fetched instruction updates that register, and the valid bit is reset to valid again.

In contrast, in our system the dynamic register file 11 provides the register scoreboarding function by checking the operands against the register address fields 41 of all other entries at the time the instruction is placed into the dynamic register file 11. When an instruction is placed into dynamic register file 11, its register address 41 is considered to be locked until that result is actually made available.

This process is shown in FIG. 7. As shown, when an instruction 701 is written into the dynamic register file 11 from the fetcher 9, the operand register numbers Rx, Ry, are compared 702 to the register address field Rz of every older instruction. If any match is found, the result field of the youngest such matching instruction is examined. If the result of execution of the youngest matching instruction is not available 704 in the dynamic register file 11, then the instruction is not runnable. If matching occurs and the result field of the youngest matching instruction is available, then the instruction can be sent to execution with its required operands obtained from the corresponding dynamic register file result field 705. If no matching occurs, the instruction can be sent to execution 706 with its operands obtained from the register file 17 rather than the dynamic register file 11. Thus, an instruction is considered shelved and not sent to execution when its operands will be affected or modified by an unexecuted older instruction.

Instruction Scheduler

The instruction scheduler 33 includes logic that determines which instructions should be run, if any. Among the information about instructions examined by the instruction scheduler to determine whether the instruction should be executed is the locker information and instruction ID. From this information, the instruction scheduler 33 picks the instructions most ready to run. The locker valid bits indicate to the instruction scheduler 33 that all of the operands necessary to execute an instruction are now in the dynamic register file 11 or in the register file 17. If the locker valid bits of an operand are set, the instruction is considered executable. The instruction scheduler picks the oldest runnable instructions for which there are sufficient execution resources available.

Because the dynamic register file 11 provides a queue between the instruction fetch and execution issue stages, it smooths temporary imbalances between the fetcher 9 arrival rate and the execution service rate. If the arrival rate temporarily exceeds the service rate, then the queue will grow. To maintain a limit on the queue size based on the fetcher rate, the execution bandwidth (i.e., the number of parallel execution streams that can receive instructions from the dynamic register file 11) is higher than the fetcher bandwidth.

Additional execution bandwidth is also important because anytime an instruction is fetched and shelved and the dynamic register file has no instructions ready for execution, there is no instruction going into execution in that cycle. When that instruction subsequently becomes executable, if there were only one execution unit, then an execution cycle would necessarily be allocated to that instruction, and a newly fetched instruction must be shelved, degrading performance. In our system, however, at the time a shelved instruction goes to execution, it can be sent via the multiplexers 53 and 55 to an additional execution unit 47, while the first execution unit 45, via the multiplexers 49 and 51 executes newly-arriving instructions. This permits parallel execution of newly-fetched instructions with older instructions sent to execution from the dynamic register file 11. Of course, more than two execution units can be employed if necessary.

Memory Scheduler

The memory scheduler 35 shown in FIG. 2 schedules the memory load instructions using the process shown in FIG. 5. The first step of a memory load operation is the generation of memory address. The address is placed in the result field 31 of dynamic register file 11 and compared 501 with the memory addresses of older store instructions that may be in the dynamic register file 11 via the domain check 59. The result of the comparison indicates if the load operation is "safe" 515, 517, "unsafe" 518, or "imprecise" 521. "Safe" means that there are no older stores to memory in the dynamic register file 11 whose memory address matches the memory address of the load operation and no older stores to memory whose addresses are still unknown. "Unsafe" means that an older store to memory exists in the dynamic register file 11 whose address is known and matches the memory address of the load operation. "Imprecise" means that there exist one or more older stores whose addresses have not yet been placed in the result field 31 of the dynamic register file 11. Only in the safe case can the load be sent to memory. If a memory load is unsafe the load cannot be sent to memory until all older store instructions with matching addresses have been sent. An imprecise load instruction must wait until the addresses for all older store instructions have been calculated, at which time it becomes either safe or unsafe. The domain checker 59 thus accomplishes essentially the same function for memory loads as the locking check does for register loads.

Once the load has been sent to memory, and memory returns the data 61, the data is written into the result field 31 for that load instruction. Once the instruction becomes the oldest, then it will be allowed to update the register file 17.

For memory stores, the result of calculating the store address is placed in the result field 31 of the dynamic register file 11. When the memory store instruction is oldest, then the address 57 and the store data 63 are sent to memory. The store data 63 is read from the register file 17 which is addressed with the register address field 41 of the dynamic register file 11. The store data 63 is known to be in the register file 17 because when the store instruction is sent to memory, every previous instruction has completed execution and transferred its result to the register file 17.

Thus, the domain checker and the load scheduler permit loads to be sent to memory as soon as possible in case their results are needed by newer instructions. Memory stores are sent in order so the memory is always in a sane state. The dynamic register file 11 and the register file 17, and the dynamic register file 11 and the system memory have the same relative relationship in that the system memory and the register file 17 are always in sane condition. The dynamic register file 11 contains future results that can be used by newer instructions with the effect of "caching" results of neighboring instructions for possible use as operands for new instructions.

Sane State Controller

The process for updating the register file 17 is summarized in FIG. 8. Updates of the register file 17 occur when instructions are oldest. The oldest results are looked at to determine if they are ready to update 801 the register file 17. If there are no trap conditions 802 indicated by the trap logic 21, the results are written into the register file 17 using the register address 41 as an address, and the result field 31 as the data, under the control of the sane state controller 19. When an instruction becomes oldest and has a trap 803 condition, it is prevented from updating the register file 17 or memory. A trap indication flag 65 (see FIG. 2) signals the trap logic 21 to handle the trap.

In this way, traps are resolved in strict sequential order. When an instruction comes from execution that generates a trap condition, its results are placed in the dynamic register file 11 together with the trap condition. Since the execution might or might not have been in strict sequential order, the processor will not operate on the trap because that instruction may not have been next to complete sequentially. Thus, if while the instruction is waiting in dynamic register file 11 to become the oldest and be transferred into the register file 17, another instruction trap (which happens to be older than the waiting instruction) occurs, this other trap will be responded to first, thereby assuring that traps are serviced in sequential order.

The sane state controller 19 maintains the update of register file 17 and memory in the order that is consistent with the order of instructions. The sane state controller 19 maintains a scoreboard of fetched instructions and their state of readiness to "retire," i.e. to update the registers of memory. When instructions are ready to retire, the sane state controller 19 is signalled by a ready flag, as illustrated in FIG. 2. The sane state controller will retire an instruction just when the instruction is ready to retire and all older instructions in the dynamic register file are also being retired, and none of those instructions has a trap condition. The number of update ports into the register file 17 is higher than the number of instructions that are fetched per cycle because of the queuing effect of the dynamic register file 11.

The dynamic register file 11 also provides for dynamic register file reallocation (also known as "register renaming") by using the result field 31 associated with every instruction. That result field 31 is associated with the register address field 41 containing the address of the destination register for that instruction. Thus, if an instruction writes to register RA, that instruction places a lock on register RA and is written in the dynamic register file 11. If the next instruction also writes to register RA, in prior art systems that instruction cannot complete until the first instruction completes. In our system the second instruction gets another position in the dynamic register file with a register address field equal to RA (same register) but with a different place holder for the results. The first instruction writes the data for RA in the first place holder and the second instruction places RA data in the second place holder. The result is multiple physical instantiations of the same register. Multiple instantiations are possible due to multiple entries in the dynamic register file 11. The renaming, or removal of ambiguity, is accomplished by the fact that each place holder has a unique instruction ID. The same register name RZ can be associated with multiple IDs located in multiple entries in the dynamic register file 11.

The register file 17 and memory are the only elements of the system that represent the state of the processor. The rest of the data in the processor, e.g., the contents of the dynamic register file 11 and the branch shelver 13, do not represent the state of the processor because of its temporary nature. When an incorrect branch prediction is detected, the flush inputs 69 derived from the branch shelver 13 can be applied to the dynamic register file 11 to eliminate all entries that are newer than the ID of the incorrect prediction. Thus, all instructions fetched and results generated after the bad prediction can be flushed from the dynamic register file 11 quickly (in one cycle). This action restores the processor to the state where the bad branch prediction occurred, enabling operation to resume with the fetching of instructions along the correct branch direction.

The entries in the dynamic register file 11 provide a large number of instructions to be considered for possible execution, thus allowing a wide search for runnable instructions. Branch prediction of multiple branches increases the number further because of the opportunity to find executable instructions within these multiple branches. This enables the processor to continue to execute instructions along branches, giving access to a larger number of instructions to increase the throughput of the processor.

The condition codes are altered by instructions that compute results and set condition codes. Those instructions that actually compute condition codes can also depend on other instructions that calculate some other results. In a stream of instructions, typically only a few of the instructions have a direct effect on the condition codes, and therefore, it is desirable to schedule those instructions with a higher priority than the rest of instructions, thus reducing the need for speculative processing. The performance of the processor can also be improved by calculating the condition codes sooner, which can be accomplished by having the instruction scheduler 35 issue those instructions with priority. In one implementation of our system, priority bits are stored with every instruction 27 for indicating to the instruction scheduler 33 in the dynamic register file 11 which instruction to pick up first.

Details of Dynamic Register

FIGS. 9a and 9b together provide a more detailed diagram of the structure of the dynamic register file 11. The dynamic register file 11 operates on the following data fields: ID 29, Instruction 27, Locker1 23, Locker2 25, RZ 41 and Result 31. The instruction is broken down in a format, as illustrated in FIG. 10, for two source registers (RX and RY) 73, 75, a destination register (RZ) 41, an operation (OP-Code field) 79, and the ID 29. The locker fields (LOCKER1 and LOCKER2) 23, 25 are used to hold the IDs of instructions that must generate results that are required as the operands pointed to by RX and RY. The fields RZ, RX, and RY are derived from the issued instruction and are part of that original instruction.

When instructions enter the dynamic register file 11, RX and RY register addresses 73, 75 are supplied 131 to search the RZ Address CAF 41 to make sure no younger instructions write to those registers. If no matches are found, the registers are considered unlocked and the operands are read from the register file 17. If either RX 73 or RY 75 matches (May-Be-Locked) 127 an entry in RZ 41 of an instruction that has not yet completed execution (i.e., Result Not Valid), that register is considered locked and the instruction cannot run.

If one or more matches are found, then for each match, the result field 31 is read to determine if it has valid data, as indicated by a valid bit in the Result register 31. If a match is found and the result field where the youngest matching instruction is found has valid data, the result field 31 is read as the operand in place of the register file 17. At the same time, the ID CAF 29 is read. If the youngest result field 31 does not contain valid data, the value read out of the ID CAF 103 will contain the youngest ID of an instruction that writes to that register, i.e., the locking instruction ID. The locking ID is written to the LOCKER field 23, 25. The two LOCKER fields (LOCKER1 23 and LOCKER2 25) correspond to register address pointers RX 73 and RY 75, respectively. Thus, if a present instruction cannot run because one or both of its operands have not been generated by older instructions, then that instruction would not run, but the IDs of those older instructions (that have to generate results for the present instruction to go into execution) are stored in LOCKER1 23 and LOCKER2 25, as previously discussed.

When an instruction is locked, the ID of the instruction that locked the register is fed to the locker field 23, 25 as a locker ID for that register. Search ports 85 in the LOCKER CAF 23, 25 sense the update busses (151 in FIG. 2 and 85 in FIG. 9*b*) for IDs which unlock instructions in the dynamic register file 11. The instruction scheduler 33 senses instructions that are no longer locked and schedules them for execution. The result of execution of an instruction is placed onto the update bus (151 in FIG. 2 and 106, 108 in FIG. 9*a*). The issue ID CAF 29 is searched 91 with the ID of the executed instruction to find where the result should be placed in the dynamic register file 11.

The Issue ID Content Addressable First In - First Out Memory CAF 29 is used to hold IDs of instructions as they are issued. The Issue ID CAF is used to find the entry position in the dynamic register file 11 result field 31 where data should be written, as well as from where it should be read. There are first-in write ports for writing IDs of instructions, and there are 6 search ports 91, 93 into the Issue ID CAF. Two of these search ports 91 allow data coming back on the update bus 106, 108 from the ALUs 45, 47 to be placed where the updated data should be written. The other four search ports 93 are used for finding where operands are within the dynamic register file 11. There are also two read ports 95 which allow the read out of the ID of an instruction that locks a register. There are two write ports 141 which write the IDs of the instructions issued into the Issue ID CAF. It is the Issue ID CAF 29 which maintains the order of instructions within the processor.

The six search port inputs 91, 93 to the Issue ID CAF 29 provide a means for locating data by its ID if it is within the result field 31. Two of the ports 91 are used by the update busses 151 to locate where within the result field 31 data should be stored. The match outputs of these ports become write enables 97 into the result field 31. The other four ports 93 are supplied by the instruction scheduler 33 to locate where within the result field 31 data needed to execute an instruction or address calculation is located. The match outputs of these ports are supplied as read enables 99 into the result field 31. The two read ports 95 are used to read out the youngest IDs of instructions that have locked registers used by RX 73 and RY 75 of the issued instruction. There are also control bits from the sane state controller 19 which direct the Issue ID CAF 29 to pop off or delete either one, two or three entries from the bottom of the FIFO. There is one age output 101 per position in the ID CAF. The age comparator 153 is used to flush younger IDs when correcting branch errors. There are also two read port outputs 103 in the Issue ID CAF 29 that supply read outs of the youngest IDs of instructions that have locked registers in the current issued instructions. Each ID location in the ID field 29 includes eight bits that are designated as the Valid Bit (1), the Color Bit (1), and the ID (6).

The result field 31 maintains result slots for instructions which may or may not have finished execution. These result slots represent multiple copies of any given register or addresses for memory operations. If data is valid in the result field 31, it may be used by other instructions for their execution, or, if the data is not valid, that register is considered locked and any instruction dependent on it must be shelved. The data in the result field 31 is used to update the register file 17 when that instruction becomes oldest. The result field 31 has write ports 106, 108 that are connected to the two update buses 151, and, when a match from the ID CAF is detected, 97 data on the update bus 151 is written into the result field 31.

There are four read ports 121 to the result field 31. Two of the ports are used by the instruction scheduler 33 for getting operands for ALU 45 (if the operands are not in the RF), and two of the ports are used in supplying operands to ALU 47 for execution. The instruction issued searches the RZ Address CAF 41 for a match. If a match is detected, the logic then determines if there is valid data in the result field 31. If there is valid data, the register is unlocked and can be read out of the dynamic register file 11. If there is not valid data in the result field, the register is locked and a locker ID 103 is supplied by the ID CAF 29. If the issued instructions are locked, the instruction scheduler 33 uses the two or the four read ports 121 for instructions that are going to the ALU 45, 47. It supplies an ID, to point to a location in the result field 31, which supplies the operands needed for a calculation.

There are three FIFO outputs 114 on the result field 31. This allows up to the three oldest instructions to update the register file at one time. There are four random read data flow out ports 145, 147 on the result field 31. These allow operands to be pulled from the dynamic register file 11, if they are valid, and sent to execution. The valid bits from the bottom three entries in the result field 31 are brought out and fed to the sane state controller 19 which responds when the valid bits indicate that the data is ready.

The RZ address CAF 41 holds the address of the register to be updated and is structured similar to the Issue ID CAF 29 for determining whether a register is locked or not. When the addresses presented to the RZ address CAF 41 at issue time match any entries inside the RZ CAF, this means that an older instruction or instructions must have written to that register before the current instruction can use it. At this point, the data may or may not be available in the dynamic register file 11. If it is not in the dynamic register file 11, the operand of the instruction will be marked as locked. When a match in the RZ address CAF 41 is not found, this means that the register is unlocked and the correct data value is in the register file 17.

There are two write ports 123, and there are also two search ports 131 on the RZ address CAF 41 which are used to determine whether or not a register is locked. There are also three FIFO outputs 125 on the RZ Address CAF 41 which represent the oldest outstanding instructions in the processor that are ready to update the register file 17. Either one, two, or three addresses may be removed at a time although the oldest instructions must go first, in order of descending age. In addition, there are two outputs 127 per entry in the RZ CAF 41 to indicate may-be-locked. These bits do not necessarily mean that a register is locked. Thus, if the data is found in the result field 31 and is valid, the register is unlocked. The may-be-locked bits 127 are the match outputs of the comparators 129 that are connected to the search port inputs 131.

Because the dynamic register file 11 acts as a queuing structure for instructions that are not ready to execute, once an instruction becomes runnable, the data flow check logic 43 checks to determine if the resources are available to run the instruction. If all of the resources are available, the instruction is put into execution. The instruction field 27 stores the instruction and all of its associated decode bits that the instruction needs for execution. When an instruction is ready for execution, these bits are placed into the execution pipeline so that the instruction does not have to be decoded again.

The Locker CAF registers 23, 25 within the dynamic register file 11 hold the IDs of instructions that lock registers needed by the instruction upon entry in the CAF. There is one Locker CAF for each RX and RY source register 73, 75 of the instruction. The search ports 85 of the CAFs monitor the update bus and sense instructions to complete. As values are returned on the update bus, the Locker CAF 23, 25 compares the ID of the data on the update bus 151 with the ID stored in such Locker CAF. When a match occurs, that register is no longer locked. When both lockers have found a match, the instruction becomes ready to run provided that there is an ALU 45, 47 available. After the match is detected, the correct value of that register will either be in the register file 17 or in the dynamic register file 11.

When instructions are shelved 707, for each operand that is locked, the ID of the youngest of the older instructions which locked the register is written into the locker field 23, 25 of the dynamic register file 11. The locker fields 23, 25 contain the IDs of the instructions for which that instruction must wait to execute to obtain its required operands. When one of those older instructions is executed it will generate a result 601 (see FIG. 6) which is required for the locked-shelved instruction. When this occurs for both lockers 23, 25, then that instruction will be ready for execution 401 (see FIG. 4).

The data-flow check logic 43 (see FIG. 2) compares 603 the IDs of instructions writing results into the result field 31 to the locker IDs of all shelved instructions. When the locker IDs match the updating IDs, those lockers are removed 602. When both lockers of an instruction are removed, that instruction becomes ready to execute 401. To allow the unshelving of an instruction and sending it to execution at the same time that a new instruction enters the dynamic register file 11 which is not locked and which can also proceed to execution, multiple execution units such as Arithmetic Logic Units (ALU) 45, 47 and the associated multiplexers 49, 51, 53 and 55, are provided.

The dynamic register file 11 also has a first-out port illustrated at 39 in FIG. 2, and at the FIFO OUTPUT ports 114, 125 in FIG. 9a. Results are moved from the FIFO-OUTPUT 114, 125 (collectively first-out port 39 of the dynamic register file 11) into the register file 17. The dynamic register file 11 has the data flow in ports (151 in FIG. 2, and 106, 108, 91, and 85 in FIGS. 9a and 9b) and the data flow out ports 145, 147, and 149 in FIGS. 9a and 9b). The data flow out ports 145, 147, 149 are used to issue instructions and their operands to execution in a data flow manner, as illustrated in FIG. 4, and the data flow in ports 151, 106, 108, 91, and 85 are used to write results of those instructions back into the dynamic register file 11. The results and the instructions that use the data flow ports might go into execution and come from execution out-of-order with respect to the sequence in which instructions were placed in the dynamic register file 11.

Details of Branch Shelf

FIG. 11 illustrates how condition codes are used by the branch execution logic. When an instruction is issued that sets the condition code register 22, the register is locked and the ID of the setting instruction 214 is saved into a lock ID register 206.

When a conditional branch instruction is encountered in the instruction stream and the condition codes are locked, it cannot be determined whether or not to take the branch. In this case, a prediction is made as to which way the branch will go. Execution continues in the predicted direction and an entry is made on a previously empty shelf 192 of the branch shelver 13. This entry contains the following information:

ID of the branch instruction 196 shelf status 198 predicted direction 200 branch mask 202 branch opcode 201 locker ID of instruction that sets the condition code 204

In making this entry, the shelf status is changed from EMPTY to UNDET, meaning that the correct branch direction is undetermined.

When a condition code has been evaluated, its value 210 is written into the condition code register 22 in FIG. 11, and the condition code register 22 is unlocked, provided that the ID of the condition code update 208 matched 216 the ID of the locker 206. This means that no subsequent instruction has been issued that also sets that same condition code register. Further, in each shelf in the branch shelver 13 that is UNDET, logic 193, 195 checks the ID of the condition code update 208 against the locker ID 204, 205 that was saved on the shelf. If these two IDs are the same, then the logic 193, 195 can determine the correct branch decision. If the initial prediction decision 200 is the same as the correct decision just evaluated, the shelf status is changed to EMPTY effectively purging the branch decision from the shelf, thus making the shelf available for other instructions. If the correct branch decision is different from the predicted branch direction, however, then the shelf status is changed to WRONG, as illustrated on 113, 115, 116, 118 and 119 in FIG. 3.

When any entry on the branch shelf has the status WRONG, all instructions in the computer that are younger than the oldest WRONG entry are purged, as illustrated at 119 in FIG. 3. Also, all the shelves in the branch shelver 13 that have instructions younger than the oldest wrong entry are set to EMPTY. Then the computer resumes fetching instructions again, starting with the branch instruction that had been the oldest WRONG instruction on the branch shelf. This second execution of the branch instruction will proceed in the correct direction since the condition codes are available.

The branch shelf is implemented as an ordered list. The ordered list is a linear structure which maintains objects in insert-order. New objects are inserted into the top of the list in such a manner that the new object is always behind previously inserted objects. Objects may be deleted from any position in the list. The insert-order precedence relation enables the determination of the relative age of objects in the list by their position in the list. An important property of this ordered list is that if X list cells are empty, than MIN(X,I) objects may be inserted where I is the number of inputs.

The implementation of the ordered list structure shown in FIG. 12 can be most easily explained by an example. Consider a two-in (I=2), two-out ordered list with N elements or cells. The top element is arbitrarily numbered 0 and the bottom N-1. In addition, each of these cells contain a valid bit used to determine if the cell is empty or full. This valid bit is set when an object is inserted into the cell and reset when an object is read (and deleted) from the cell. An object within the list moves from the top towards the bottom whenever empty cells exist below the object.

This structure may be constructed from a set of connected multiplexer-register pairs. The registers form the list cells and the multiplexers perform data routing. The multiplexers connect the input to register i (i=0,1,2 . . . , N–1) to the output of register i, i-1, and i-2 corresponding to hold, shift(1), and shift(2). The i-1 input of cell 0 and the i-2 input of cell 1 form the two list inputs. The i-2 input of cell 0 is unused. Two read ports are included which can read and delete any two objects within the ordered list.

The multiplexers are controlled by the following logic:

```
For cell i (i=0,1,2, . . . ,N–1),
    If cells i+1 through N–1 are full, hold;
    Else
        If there exists only one empty cell i+1 through
                    N–1, shift(1);
        Else shift(2);
```

The effect of the logic above is that upon removal of an object from any position in the list, the list is "collapsed" downward providing empty cells on the top of the list immediately available for insertion of new objects. The logic therefore, satisfies the MIN(I,X) relation described above. Only I (I=the number of inputs) cells must be collapsed at one time to allow I inputs even if more than I cells are empty. The shift(1) and shift(2) functions perform the collapsing.

The branch shelver is a special version of the above implementation. The difference is that the read ports described above, which can read and delete any two objects from the list, are replaced by a mechanism which can delete any number of objects from the list and read any number of objects from the list. The logic which controls the movement of objects within the list is exactly the same.

Another unique feature of the processor of our invention is its capability for sorting instructions by type for assignment to selected ones of multiple arithmetic logic units. FIG. 13 is a diagram illustrating this feature of our system. Of the potential instructions in the dynamic register file possibly ready for execution, there may be several different arithmetic logic units to which any instruction may be sent. The object of the logic shown in FIG. 13 is to pick the three oldest instructions and send them to the available ALUs. Because not each ALU can perform all computations, the instructions must be sorted and assigned to the proper ALU. In FIG. 13, ALU 1 300 and ALU 2 305 perform all non-memory instructions, while ALU 3 310 performs only memory instructions. By memory only instructions, we refer to instructions in which memory addresses are computed, as well as some special move operations allowing data transfer among chips in the system. While the three ALUs in FIG. 13 perform integer operations, the same architecture could be employed with floating point ALUs.

Memory 315 contains type information. The type information comes from a predecoding of the instruction and relies upon a bit in the instruction. The output from the type memory 315 is supplied to logic 320 and 325, which in conjunction with the ready bit allow logic 330 to pick the oldest instruction ready for execution which requires the memory only ALU 310. The other path from type memory 315 allows picking the oldest and second-oldest non-memory instructions and supplying them to ALU 300 and ALU 305.

FIG. 14 illustrates the operation of the flushing mechanism for flushing instructions from the dynamic register file. Instructions must be flushed from the dynamic register file when they have been placed there on speculation, for example, based upon a branch prediction, and the prediction is later determined to be incorrect. In this circumstance, one wishes to flush the instructions from the dynamic register file between the designated instruction and the youngest instruction. FIG. 14*a* illustrates an example in which the youngest and oldest instructions are designated along with an instruction X which has been determined to be improperly predicted for execution. In the example depicted, the youngest instruction is not next to the oldest instruction because the register is not full of instructions, only partially full. In the example, it is desired to flush all of the instructions between instruction X and the youngest instruction. Another example is shown in FIG. 16*b* in which the youngest instruction is adjacent to the oldest instruction, while the instructions requiring flushing are below the oldest instruction near the bottom of the register.

Flushing of the bad instructions in either of the examples of FIGS. 14*a* and 14*b* may be achieved by generation of two vectors by the system. The first vector consists of ID's extending upward from the flush ID instruction, while the second vector extends downward from the oldest ID instruction. These vectors are shown at the right-hand side of FIGS. 14*a* and 14*b*.

The instructions which are to be flushed are determined by comparing the flush ID with the ID of the oldest instruction. If the flush identification is lower than the identification of the oldest instruction, then the region of instructions in which the two vectors overlap is flushed. This is shown in FIG. 14*b*. On the other hand, if the flush ID is not less than the oldest ID, as shown in FIG. 14*a,* then an "OR" operation is performed in which all instructions designated by either of the vectors are flushed. Thus, in FIG. 14*a* all of the instructions above the flush ID and all of the instructions below the oldest instruction will be flushed.

In the preferred embodiment, the logic implementing this technique described by:

Flush Vector=Flush ID and up

Oldest Vector=Oldest ID and down

If Flush ID<Oldest ID,

Then Flush Vector "and" Oldest Vector

Else Flush Vector "or" Oldest Vector

While the foregoing has been a description of a preferred embodiment of the processor architecture of our invention, it should be understood that many details of the architecture and its operation have been provided to explain the preferred embodiment. The scope of our invention is defined by the appended claims.

What is claimed is:

1. A data processing system for processing information in response to a series of instructions including instructions that control arithmetic operations on the information, the data processing system comprising:

register means for storing information;

fetching means for continuously fetching instructions from the series of instructions;

shelving means coupled to the fetching means to receive fetched instructions and to store multiple such instructions in the order fetched, wherein each instruction within said shelving means is identified by a sequential instruction identifier assigned in the order fetched;

scheduling means coupled to the shelving means for continuously selecting instructions in the shelving means for which all information required for execution is available in one of the register means or the shelving means and for issuing those instructions for execution in an order independent of the order in which those instructions were fetched;

arithmetic means coupled to the scheduling means for performing operations on information in one of the register means or the shelving means in response to instructions supplied from the shelving means to generate execution results, the arithmetic means further coupled to the shelving means so that the shelving means receives the results of execution of instructions and is capable of storing the result of the execution of every instruction stored within said shelving means; and retirement means for copying results of the execution of the oldest instruction in the shelving means into the register means and removing that instruction from the shelving means.

2. A data processing system according to claim 1 in which a unique result identifier is stored with each instruction execution result in the shelving means.

3. A data processing system according to claim 2 in which the result identifier of an instruction is identical to the instruction identifier.

4. A data processing system according to claim 2 in which the shelving means stores one or more unique instruction identifiers with each instruction requiring information in the shelving means in order to execute, the unique instruction identifiers identifying instructions in the shelving means generating the information needed to execute the instruction.

5. A data processing system according to claim 1 in which:

the register means comprises an array of registers, each register having a unique register number;

each arithmetic instruction in the series of instructions contains a destination comprising a register number and contains at least one operand register number; and the scheduling means determines that all information required for executing an arithmetic instruction is available only when, for each operand contained in that instruction, either no instruction in the shelving means has a destination equal to that operand or the results of the most-recently-fetched instruction in the shelving means whose destination equals that operand are available.

6. A data processing system according to claim 5 in which, for each operand of each instruction stored in the shelving means for which there is a set of instructions in the shelving means whose destination equals the operand of the instruction, the shelving means stores a locker, equal to unique identifier of the most recently fetched instruction from that set.

7. A data processing system according to claim 6 in which:

the shelving means stores a locked bit with each operand of each instruction stored in the shelving means, which bit is a first logic level if and only if there is a set of instructions in the shelving means that were fetched prior to said instruction and whose destinations equal the operand of the instruction, and the results of the most recently fetched instruction in the set of instructions are not available in the shelving means;

the arithmetic means accepts from the shelving means an instruction identifier together with each instruction and returns the identifier to the shelving means with the result of executing that instruction;

the scheduling means supplies, with each instruction to the arithmetic means, the unique instruction identifier stored with that instruction in the shelving means;

the shelving means accepts the unique instruction identifier returned by the arithmetic means with each result, and sets to a second logic level the locked bit stored by the shelving means with every operand of every instruction, the locker of which operand equals the returned identifier; and the scheduling means determines that all information required for executing an arithmetic instruction is available just when, for each operand contained in that instruction, the locked bit is at the second logic level.

8. A data processing system according to claim 7 in which the scheduling means determines for each instruction supplied from the shelving means to the arithmetic means, whether any information needed for that instruction to execute that was once stored in the shelving means is still there, by comparing the age of the locker of each operand of the instruction against the age of the oldest instruction in the shelving means.

9. A data processing system according to claim 1 in which there are multiple arithmetic means which may supply results to the shelving means simultaneously.

10. A data processing system according to claim 10 in which the scheduling means is capable of simultaneously supplying each of several of the arithmetic means with a different instruction from the shelving means, along with the information needed to execute each of said different instructions stored in either the register means or the shelving means.

11. A data processing system for processing information in response to a series of instructions including instructions that control arithmetic operations on the information, the data processing system comprising:

register means for storing information;

fetching means for continuously fetching instructions from the series of instructions;

shelving means coupled to the fetching means to receive fetched instructions and to store multiple such instructions in the order fetched and to store a unique instruction identifier with each instruction;

scheduling means coupled to the shelving means for continuously selecting instructions in the shelving means for which all information required for execution is stored in one of the register means or the shelving means and for issuing those instructions for executing in an order independent of the order in which those instructions were fetched and responsive to availability of information needed for execution of said instructions;

arithmetic means coupled to the scheduling means for performing operations on information in one of the register means or the shelving means in response to instructions supplied from the shelving means to generate execution results, the arithmetic means further coupled to the shelving means so that the shelving means receives the results of execution of instructions and is capable of storing the result of the execution of every instruction stored within said shelving means along with a unique result identifier; and means for copying results of the execution of the oldest instruction in the shelving means into the register means and removing that instruction from the shelving means; and wherein the shelving means stores one or more unique instruction identifiers with each instruction requiring information needed to execute, the unique instruction identifiers identifying instructions generating the information needed to execute the instruction.

12. A data processing system for processing information in response to a series of instructions including instructions that control arithmetic operations on the information, the data processing system comprising:

register means for storing information comprising an array of registers, each register having a unique register number;

fetching means for continuously fetching instructions from the series of instructions, each arithmetic instruction in the series of instructions containing a destination comprising a register number and containing at least one operand register number;

shelving means coupled to the fetching means to receive fetched instructions and to store multiple such instructions in the order fetched, wherein for each operand of each instruction stored in the shelving means for which there is a set of instructions in the shelving means whose destination equals the operand of the instruction, the shelving means stores a locker, equal to the unique identifier of the most recently fetched instruction from that set;

scheduling means coupled to the shelving means for continuously selecting instructions in the shelving means for which all information required for execution is stored in one of the register means or the shelving means and for issuing those instructions for executing in an order independent of the order in which those instructions were fetched and responsive to availability of information needed for execution of said instructions, the scheduling means determining that all information required for executing an arithmetic instruction is stored only when, for each operand contained in that instruction, either no instruction in the shelving means has a destination equal to that operand or the results of the most-recently-fetched instruction in the shelving means whose destination equals that operand are available;

arithmetic means coupled to the scheduling means for performing operations on information in one of the register means or the shelving means in response to instructions supplied from the shelving means to generate execution results, the arithmetic means further coupled to the shelving means so that the shelving means receives the results of execution of instructions and is capable of storing the result of the execution of every instruction stored within said shelving means; and means for copying results of the execution of the oldest instruction in the shelving means into the register means and removing that instruction from the shelving means.

13. A data processing system according to claim 12 in which:

the shelving means stores a locked bit with each operand of each instruction stored in the shelving means, which bit is a 1 if and only if there is a set of instructions in the shelving means that were fetched prior to said instruction and whose destinations equal the operand of the instruction, and the results of the most recently fetched instruction in the set of instructions are not stored in the shelving means;

the arithmetic means accepts an instruction identifier together with each instruction and returns the identifier with the result of executing that instruction;

the scheduling means supplies, with each instruction to the arithmetic means, the unique instruction identifier stored with that instruction in the shelving means;

the shelving means accepts the unique instruction identifier returned by the arithmetic means with each result, and sets to 0 the locked bit stored by the shelving means with every operand of every instruction, the locker of which operand equals the returned identifier; and the scheduling means determines that all information required for executing an arithmetic instruction is stored just when, for each operand contained in that instruction, the locked bit is 0.

14. A data processing system according to claim 13 in which the scheduling means determines for each instruction supplied from the shelving means to the arithmetic means, whether any information needed for that instruction to execute that was once stored in the temporary storage means is still there, by comparing the age of the locker of each operand of the instruction against the age of the oldest instruction in the shelving means.

15. A data processing system for processing information in response to a series of instructions including instructions that control arithmetic operations on the information, the data processing system comprising:

register means for storing information;

fetching means for continuously fetching instructions from the series of instructions;

shelving means coupled to the fetching means to receive fetched instructions and to store multiple such instructions in the order fetched;

scheduling means coupled to the shelving means for continuously selecting instructions in the shelving means for which all information required for execution is stored in one of the register means or the shelving means and for issuing those instructions for executing in an order independent of the order in which those instructions were fetched and responsive to availability of information needed for execution of said instructions;

multiple arithmetic means coupled to the scheduling means for simultaneously performing operations on information in one of the register means or the shelving means in response to instructions supplied from the shelving means to generate execution results, the arithmetic means further coupled to the shelving means so that the shelving means receives the results of execution of instructions and is capable of storing the result of the execution of every instruction stored within said shelving means, the scheduling means being capable of simultaneously supplying each of several of the arithmetic means with a different instruction from the shelving means, along with the information needed to execute each of said different instructions stored in either the register means or the shelving means; and means for copying results of the execution of the oldest instruction in the shelving means into the register means and removing that instruction from the shelving means.

16. A data processing system for processing information in response to a chronologically ordered series of instructions, wherein certain instructions of the series perform arithmetic operations on one or more operands identified by a register identifier, the data processing system comprising:

a register array including a plurality of registers, each register storing information associated with a register identifier;

an instruction fetcher for fetching instructions from the series of instructions;

an instruction shelver coupled to the instruction fetcher to receive fetched instructions and to store multiple such instructions, each stored instruction being stored within a data entry that includes an instruction field for holding the stored instruction, a result field for holding a result of the instruction, and a destination field for holding a register identifier associated with the result of the instruction;

an instruction scheduler coupled to the instruction shelver for continuously selecting instructions in the instruction shelver for which all operands required for execution are stored in one of the register array or the result fields of data entries within the instruction shelver and for issuing those instructions for executing in an order independent of the chronological order of the series of instructions and responsive to availability of operands needed for execution of said instructions;

an arithmetic execution unit coupled to the instruction scheduler and the instruction shelver for executing an instruction issued by the instruction scheduler and transmitting the result of the issued instruction to the result field of the data entry within which the issued instruction is stored, wherein an operand required for execution of the issued instruction and identified by a first register identifier is obtained from the register array only when no data entry within the instruction shelver includes an executed instruction and a destination field holding the first register identifier, and when a set of one or more data entries include an executed instruction and a destination field holding the first register identifier, obtaining the required information from the result field of the data entry of the set having the most recently executed instruction;

means for copying the result field of the oldest data entry in the instruction shelver into the register identified by the destination field of that data entry and removing that data entry from the instruction shelver.

17. A data processing system according to claim 16 in which each data entry within the instruction shelver includes a unique instruction identifier.

18. A data processing system according to claim 17 in which each data entry within the instruction shelver includes a unique result identifier.

19. A data processing system according to claim 18 in which the result identifier within a data entry is identical to the instruction identifier.

20. A data processing system according to claim 18 in which a data entry includes a field for holding an instruction identifier of the youngest data entry having a destination field equal to a register identifier of an operand of the instruction stored in the data entry.

21. A data processing system according to claim 20 in which the instruction scheduler determines that all operands required for executing an arithmetic instruction are stored only when, for each register identifier identifying an operand required by that instruction, either no data entry in the instruction shelver has a destination field equal to that register identifier, or the most recently fetched instruction in the instruction shelver included in the same data entry with a destination field equal to that register identifier has already been executed.

22. A data processing system according to claim 21 in which, for each operand of each instruction stored in the instruction shelver for which there is a set of data entries in the instruction shelver whose destination fields equal the operand, the instruction shelver stores a locker in the data entry of the instruction, equal to the unique identifier of the data entry from that set holding the most recently fetched instruction.

23. A data processing system according to claim 22 in which:

each data entry includes a locked bit associated with each operand of the instruction held by the data entry, which bit is a 1 if and only if there is a set of instructions in the instruction shelver that were fetched prior to the instruction held by the data entry and the destination fields of the data entries holding the set of instructions equal the register identifier identifying the operand with which the locked bit is associated, and the results of the most recently fetched instruction in the set of instructions are not stored in the instruction shelver;

the arithmetic execution unit accepts an instruction identifier together with each instruction and returns the identifier with the result of executing that instruction;

the instruction scheduler supplies, with each instruction to the arithmetic execution unit, the unique instruction identifier stored in the data entry of that instruction;

the instruction shelver accepts the unique instruction identifier returned by the arithmetic execution unit with each result, and sets to 0 the locked bit associated with every operand of every instruction, the locker of which operand equals the returned identifier; and the instruction scheduler determines that all operands required for executing an arithmetic instruction is stored just when, for each operand contained in that instruction, the locked bit is 0.

24. A data processing system according to claim 23 in which the instruction scheduler determines for each instruction supplied from the instruction shelver to the arithmetic shelver, whether any information needed for that instruction to execute that was once stored in the instruction shelver is still there, by comparing the age of the locker of each operand of the instruction against the age of the oldest instruction in the shelving instruction shelver.

25. A data processing system according to claim 16 in which the arithmetic execution unit comprises multiple execution subunits which may supply results to the instruction shelver simultaneously.

26. A data processing system according to claim 25 in which the instruction scheduler is capable of simultaneously supplying each of several of the execution subunits with a different instruction from the instruction shelver, along with the information needed to execute each of said different instructions.

27. A data processing system for processing information in response to a series of instructions including instructions that control arithmetic operations on the information, the data processing system comprising:

register means for storing information;

fetching means for continuously fetching instructions from the series of instructions;

shelving means coupled to the fetching means to receive fetched instructions and to store multiple such instructions in the order fetched, wherein each instruction within said shelving means is identified by a sequential instruction identifier assigned in the order fetched;

scheduling means coupled to the shelving means for continuously selecting instructions in the shelving means for which all information required for execution is available in one of the register means or the shelving means and for issuing those instructions for execution in an order independent of the order in which those instructions were fetched;

arithmetic means coupled to the scheduling means for performing operations on information in one of the register means or the shelving means in response to instructions supplied from the shelving means to generate execution results, the arithmetic means further coupled to the shelving means so that the shelving means receives the results of execution of instructions and is capable of storing the one and only one copy of the result of the execution of every instruction stored within said shelving means; and retirement means for copying results of the execution of the oldest instruction in the shelving means into the register means and removing that instruction from the shelving means.

28. A data processing system according to claim 27 in which a unique result identifier is stored with each instruction execution result in the shelving means.

29. A data processing system according to claim 28 in which the result identifier of an instruction is identical to the instruction identifier.

30. A data processing system according to claim 28 in which the shelving means stores one or more unique instruction identifiers with each instruction requiring information in the shelving means in order to execute, the unique instruction identifiers identifying instructions in the shelving means generating the information needed to execute the instruction.

31. A data processing system according to claim 28 in which:

the register means comprises an array of registers, each register having a unique register number;

each arithmetic instruction in the series of instructions contains a destination comprising a register number and contains at least one operand register number; and the scheduling means determines that all information required for executing an arithmetic instruction is stored only when, for each operand contained in that instruction, either no instruction in the shelving means has a destination equal to that operand or the results of the most-recently-fetched instruction in the shelving means whose destination equals that operand are available.

32. A data processing system according to claim 31 in which, for each operand of each instruction stored in the shelving means for which there is a set of instructions in the shelving means whose destination equals the operand of the instruction, the shelving means stores a locker, equal to a unique identifier of the most recently fetched instruction from that set.

33. A data processing system according to claim 32 in which:

the shelving means stores a locked bit with each operand of each instruction stored in the shelving means, which bit is a first logic level if and only if there is a set of instructions in the shelving means that were fetched prior to said instruction and whose destinations equal the operand of the instruction, and the results of the most recently fetched instruction in the set of instructions are not available in the shelving means;

the arithmetic means accepts from the shelving means an instruction identifier together with each instruction and returns the identifier to the shelving means with the result of executing that instruction;

the scheduling means supplies, with each instruction to the arithmetic means, the unique instruction identifier stored with that instruction in the shelving means;

the shelving means accepts the unique instruction identifier returned by the arithmetic means with each result, and sets to a second logic level the locked bit stored by the shelving means with every operand of every instruction, the locker of which operand equals the returned identifier; and the scheduling means determines that all information required for executing an arithmetic instruction is available just when, for each operand contained in that instruction, the locked bit is at the second logic level.

34. A data processing system according to claim 33 in which the scheduling means determines for each instruction supplied from the shelving means to the arithmetic means, whether any information needed for that instruction to execute that was once stored in the shelving means is still there, by comparing the age of the locker of each operand of the instruction against the age of the oldest instruction in the shelving means.

35. A data processing system according to claim 27 in which there are multiple arithmetic means which may supply results to the shelving means simultaneously.

36. A data processing system according to claim 35 in which the scheduling means is capable of simultaneously supplying each of several of the arithmetic means with a different instruction from the shelving means, along with the information needed to execute each of said different instructions stored in either the register means or the shelving means.

\* \* \* \* \*